United States Patent
Penley et al.

(10) Patent No.: US 7,506,930 B2
(45) Date of Patent: Mar. 24, 2009

(54) PASSENGER SEATING WITH VARIABLE LENGTH SEAT BOTTOM

(75) Inventors: James Randy Penley, Pfafftown, NC (US); Lars Kroeplin, Frankfurt (DE); Joachim Gustav Voigt, Nidderau (DE)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/941,726

(22) Filed: Nov. 16, 2007

(65) Prior Publication Data

US 2008/0079303 A1    Apr. 3, 2008

Related U.S. Application Data

(62) Division of application No. 11/012,955, filed on Dec. 15, 2004, now Pat. No. 7,341,309.

(60) Provisional application No. 60/589,297, filed on Jul. 20, 2004, provisional application No. 60/529,686, filed on Dec. 15, 2003.

(51) Int. Cl.
    *A47C 3/025* (2006.01)
(52) U.S. Cl. .............................. 297/284.11; 297/284.3; 297/312; 297/337
(58) Field of Classification Search ................. 297/312, 297/337, 284.11, 215.14, 452.39, 284.1, 297/284.3, 452.15, 452.63
    See application file for complete search history.

(56) References Cited

U.S. PATENT DOCUMENTS

| 439,088 A | * | 10/1890 | Allen .................... 297/188.12 |
| 3,215,468 A | | 11/1965 | Swenson et al. |
| 3,446,532 A | * | 5/1969 | Cramer ...................... 297/312 |
| 3,550,953 A | * | 12/1970 | Neale .......................... 297/312 |
| 3,632,166 A | | 1/1972 | Lohr |
| 3,762,769 A | | 10/1973 | Poschl |
| 3,833,257 A | | 9/1974 | Dove |
| 4,018,166 A | | 4/1977 | Gutridge et al. |
| 4,018,477 A | | 4/1977 | Hogan |
| 4,756,034 A | | 7/1988 | Stewart |
| 4,966,413 A | * | 10/1990 | Palarski ...................... 297/330 |
| 5,507,555 A | | 4/1996 | Kiguchi |
| 5,560,681 A | | 10/1996 | Dixon et al. |
| 5,755,488 A | | 5/1998 | Beda et al. |
| 5,857,745 A | | 1/1999 | Matsumiya |

(Continued)

FOREIGN PATENT DOCUMENTS

EP    0869061 A3    11/1999

(Continued)

*Primary Examiner*—Laurie K Cranmer
(74) *Attorney, Agent, or Firm*—Adams Intellectual Property Law, P.A.

(57) ABSTRACT

A seat bottom assembly for a passenger seat includes a flexible support panel having a left portion and a separate right portion, and a structural support member underlying the support panel. The structural support member is selectively moveable between a first, forward position in which the seat bottom assembly has a nominal length in a longitudinal direction, and a second, rearward position in which a forward portion of the support panel folds downward over the structural support member such that at least a portion of the seat bottom assembly has an effective length less than the nominal length. The effective length of the left portion and the right portion of the seat bottom assembly can be independently varied.

13 Claims, 9 Drawing Sheets

U.S. PATENT DOCUMENTS

| | | |
|---|---|---|
| 5,954,401 A | 9/1999 | Koch et al. |
| 5,992,798 A | 11/1999 | Ferry |
| 6,059,364 A | 5/2000 | Dryburgh et al. |
| 6,119,980 A | 9/2000 | Ferry |
| 6,276,635 B1 | 8/2001 | Ferry et al. |
| 6,305,644 B1 | 10/2001 | Beroth |
| 6,375,261 B1 | 4/2002 | Link |
| 6,398,306 B1 | 6/2002 | Mack |
| 6,412,870 B1 | 7/2002 | Higgins et al. |
| 6,494,536 B2 | 12/2002 | Plant |
| 6,692,069 B2 | 2/2004 | Beroth et al. |
| 6,769,739 B2 | 8/2004 | Salzer et al. |
| 6,827,402 B2 | 12/2004 | Habermann et al. |
| 6,832,814 B2 | 12/2004 | Stenzel et al. |
| 6,890,030 B2 | 5/2005 | Wilkerson et al. |
| 7,108,322 B2 * | 9/2006 | Erker .................... 297/284.11 |
| 2003/0075962 A1 | 4/2003 | Saltzer et al. |
| 2003/0085597 A1 | 5/2003 | Ludeke et al. |

FOREIGN PATENT DOCUMENTS

| | | |
|---|---|---|
| EP | 1043225 A2 | 10/2000 |
| EP | 1044878 A2 | 10/2000 |
| EP | 1097864 A1 | 5/2001 |
| GB | 2295962 A | 6/1996 |
| GB | 2331237 A | 5/1999 |
| JP | 3-1837 | 1/1991 |
| WO | 93/17604 A1 | 9/1993 |
| WO | 01/32506 A1 | 10/2000 |

* cited by examiner

PASSENGER SEATING WITH VARIABLE LENGTH SEAT BOTTOM

CROSS-REFERENCE TO RELATED APPLICATIONS

This application is a divisional application of U.S. patent application Ser. No. 11/012,955 filed Dec. 15, 2004, which claims the benefit of U.S. Provisional Application No. 60/529,686 filed Dec. 15, 2003, and U.S. Provisional Application No. 60/589,297, filed Jul. 20, 2004.

BACKGROUND OF THE INVENTION

This invention relates generally to vehicle seating and more particularly to a tourist/coach class aircraft seating arrangement. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost. However, this space limitation can produce passenger discomfort or possibly even physical ailments, and also makes it difficult for a passenger to find a comfortable position in which to sleep on long flights.

To alleviate discomfort, it is advantageous for a passenger to sit or lie in various non-conventional positions during a flight. Unfortunately, prior art coach class seats do not readily accommodate varied seating positions.

BRIEF SUMMARY OF THE INVENTION

Therefore, it is an object of the present invention to provide a vehicle passenger seat which allows a passenger to sit in various positions.

It is another object of the present invention to provide a seat bottom having a length which is selectively variable.

It is another object of the present invention to provide a seat bottom in which the length of different portions thereof is selectively variable.

These and other objects of the present invention are achieved in the preferred embodiments disclosed below by providing a variable-length bottom assembly for a passenger seat, including a flexible component; and a structural support member underlying the flexible component. The support member is selectively moveable between a first, forward position in which the seat bottom has a nominal length in a longitudinal direction, and a second, rearward position in which a portion of the flexible component bends downward over the structural component such that at least a portion of the seat bottom assembly has an effective length less than the nominal length.

According to another embodiment of the present invention, the variable-length bottom assembly further includes means for selectively locking the structural support member in a selected position.

According to another embodiment of the present invention, the flexible component is a generally planar support panel having a plurality of laterally-extending pivotable segments.

According to another embodiment of the present invention, the structural support member includes at least one longitudinally-extending support rail.

According to another embodiment of the present invention, the variable-length bottom assembly further includes a longitudinally-extending second support rail spaced apart from the at least one support rail.

According to another embodiment of the present invention, a front end of the support rail includes a rounded upper corner at a front end thereof.

According to another embodiment of the present invention, the effective length of a left portion and a right portion of the seat bottom assembly can be independently varied.

According to another embodiment of the present invention, the flexible component is a generally planar support panel having left and right portions, each of the left and right portions including a plurality of laterally-extending pivotable segments.

According to another embodiment of the present invention, the structural support member includes a pair of spaced-apart, separately moveable longitudinally-extending support rails.

According to another embodiment of the present invention, each of the support rails has a passenger-operable handle attached thereto.

According to another embodiment of the present invention, a passenger seat includes: a frame for being attached to a floor of a vehicle; an upwardly-extending seat back carried by the frame; and a variable-length seat bottom disposed on the frame for supporting a passenger, the seat bottom including: a flexible component; and a structural support member underlying the flexible component. The support member is selectively moveable between a first, forward position in which the seat bottom has a nominal length in a longitudinal direction, and a second, rearward position in which a portion of the flexible component bends downward over the structural component such that at least a portion of the seat bottom has an effective length less than the nominal length.

According to another embodiment of the present invention, a passenger seat includes a frame for being attached to a floor of a vehicle; an upwardly-extending seat back carried by the frame; and a variable-length seat bottom disposed on the frame for supporting a passenger, wherein the effective length of a left side and a right side of the seat bottom, measured in a longitudinal direction, is independently selectively variable.

BRIEF DESCRIPTION OF THE DRAWINGS

The subject matter that is regarded as the present invention may be best understood by reference to the following description taken in conjunction with the accompanying drawing figures in which.

DETAILED DESCRIPTION OF THE INVENTION

Figure 1:
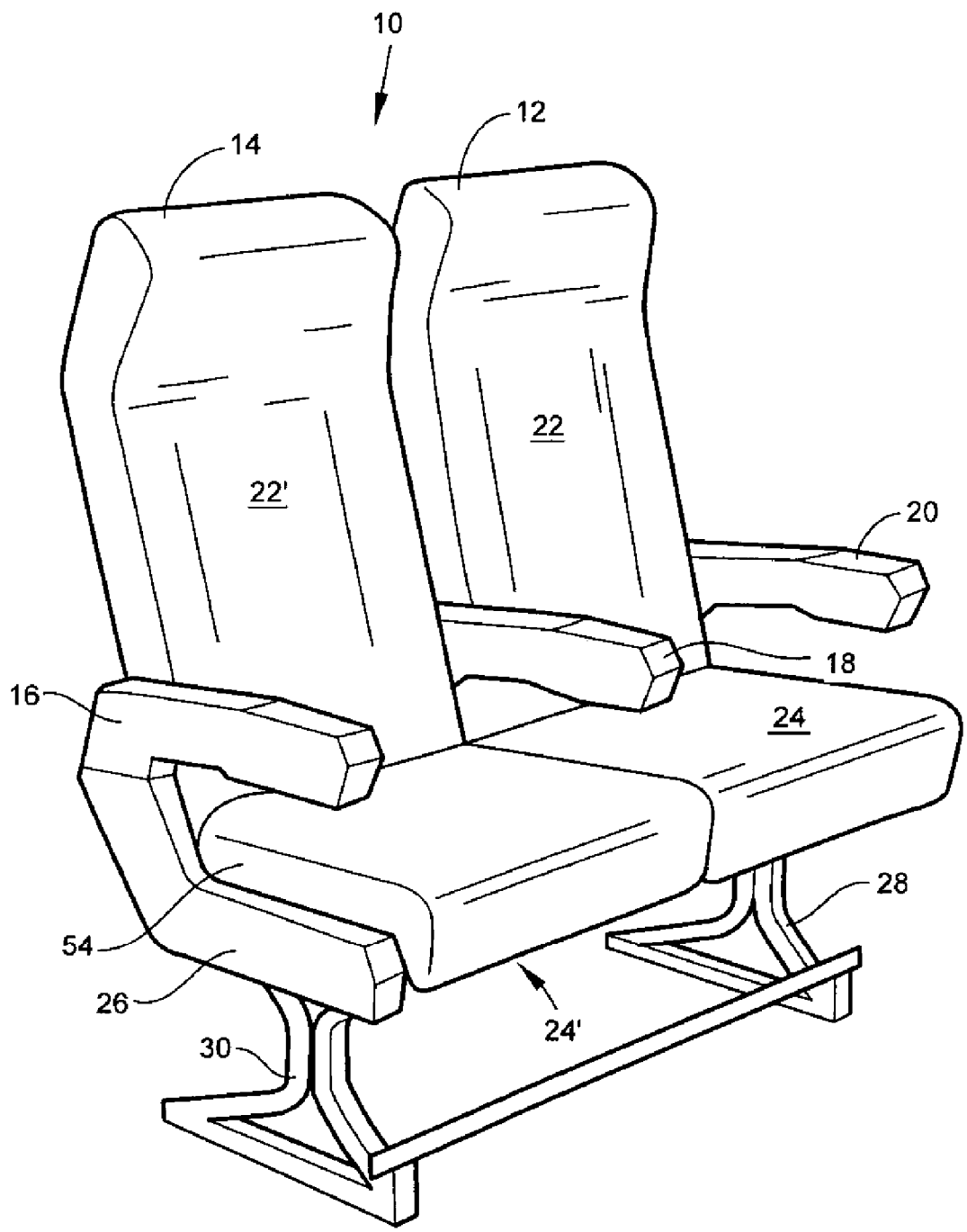
FIG. 1 is a perspective view of a passenger seat set including a variable length seat bottom.

Referring to the drawings wherein identical reference numerals denote the same elements throughout the various views, FIGS. 1-7 illustrate a passenger seat set 10 incorporating a variable length seat bottom. The seat set 10 includes two seats 12 and 14 which are collectively provided with three arm rests 16, 18, and 20, each shown in the lowered passenger use position. The seats include seat backs 22 and 22' and seat bottoms 24 and 24'. The seats 12 and 14 are supported by a frame 26. The frame 26 is mounted on legs 28 and 30 which are in turn mounted to the deck of the aircraft by track fittings of a known type. For illustrative purposes, the variable length seat bottom is only shown in detail with respect to the seat 14, however it will be understood that the same type of seat bottom may also be implemented on the other seat 12.

Figure 4:
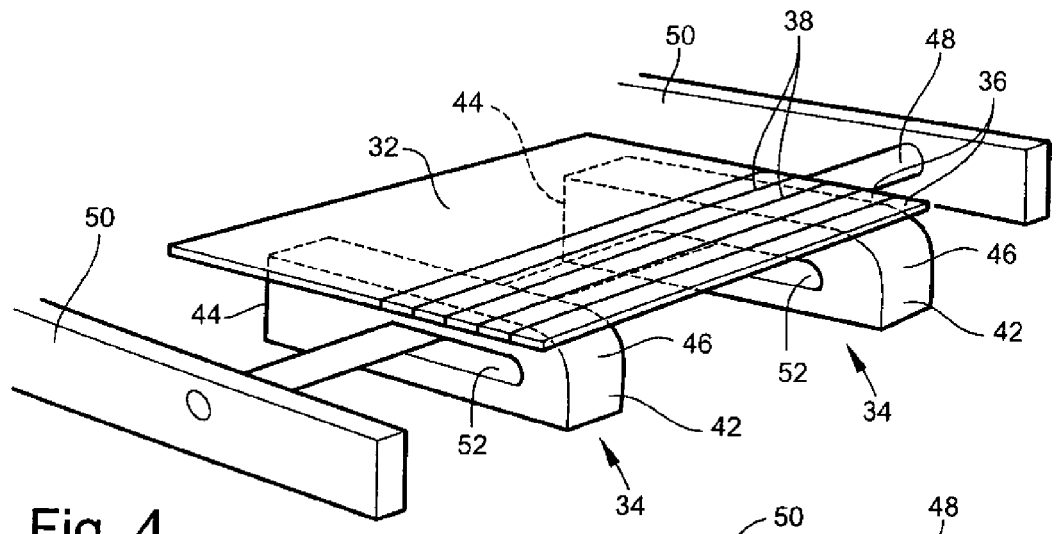
FIG. 4 is a schematic perspective view of the interior components of the seat bottom of FIG. 1, in a raised position.

As shown in FIGS. 3-6, the internal components of the seat bottom 24' comprise a variable length support panel 32 and at least one support rail 34. Referring to FIG. 4, the support panel 32 is a generally planar member which is constructed to be substantially rigid except in a selected folding direction. In the illustrated example, the support panel 32 is constructed from a sheet of plastic or similar material approximately 3.2 mm (0.125 in.) thick, the front portion of which is divided into relatively narrow transversely-extending lateral segments 36 by spaced-apart transversely-extending cuts or rabbets 38 which extend partway through the thickness of the support panel 32. One or more longitudinally-extending support rails 34 are disposed underneath support panel 32 to transfer loads from the support panel 32 to the seat frame 26. Each support rail 34 has a forward end 42 and an aft end 44. The upper portion of the forward end 42 defines a radius or bullnose 46.

Suitable means are provided for supporting the loads on the support panel 32 and the support rails 34 while allowing longitudinal sliding motion of the support rails 34. In the illustrated example, a rod 48 is fixed to side members 50 of the seat frame 26 and extends laterally through slots 52 formed in the support rails 34. Suitable padding or a cushion (not shown) may be placed on top of the support panel 32. The seat bottom 24' is covered with a dress cover 54 (see FIG. 1) which provides a unified appearance to the seat 14 and prevents debris from falling into the working parts of the seat 14.

Figure 2:
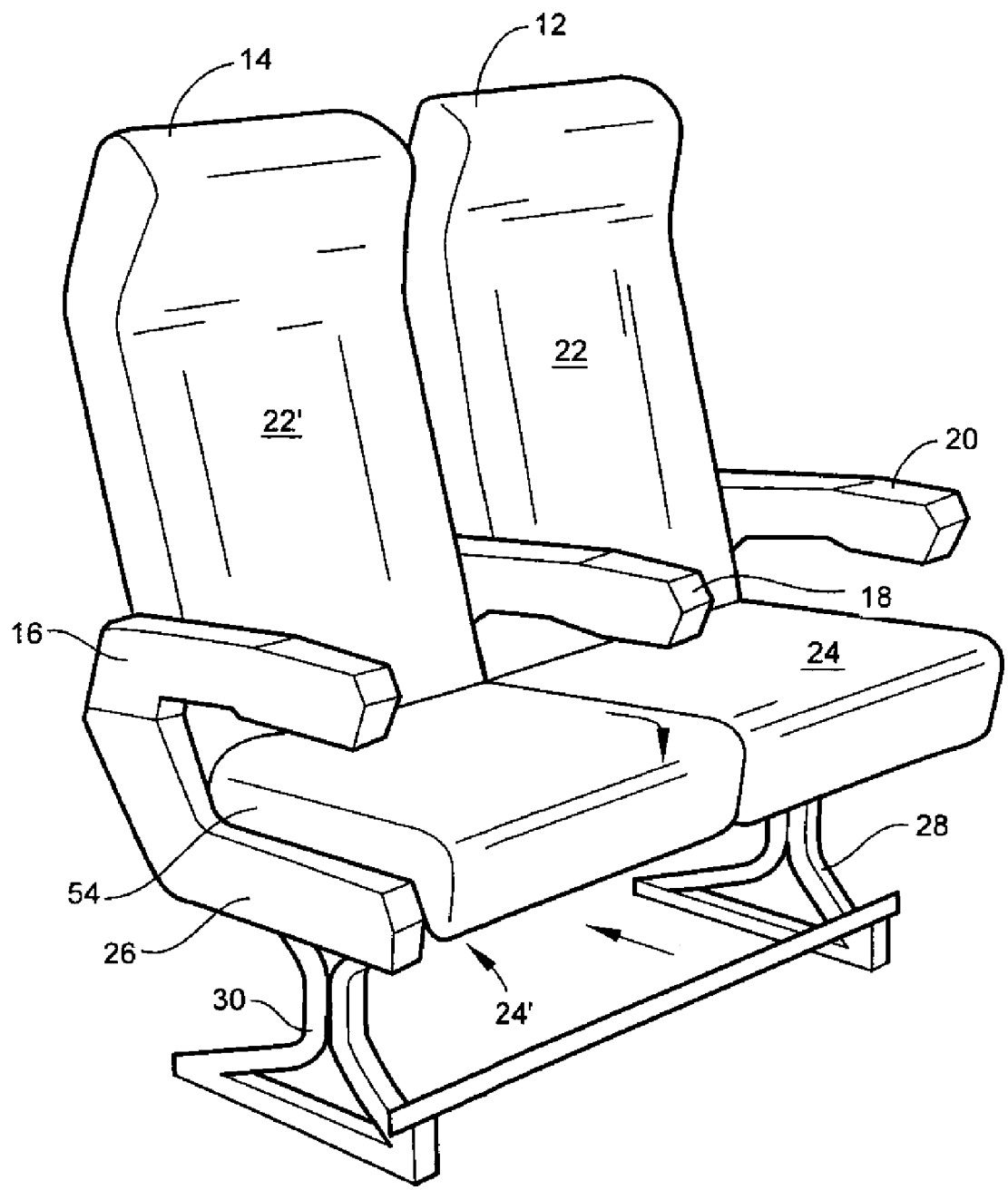
FIG. 2 is another perspective view of the seat set shown in FIG. 1, showing the seat bottom in a lowered position.
Figure 3:
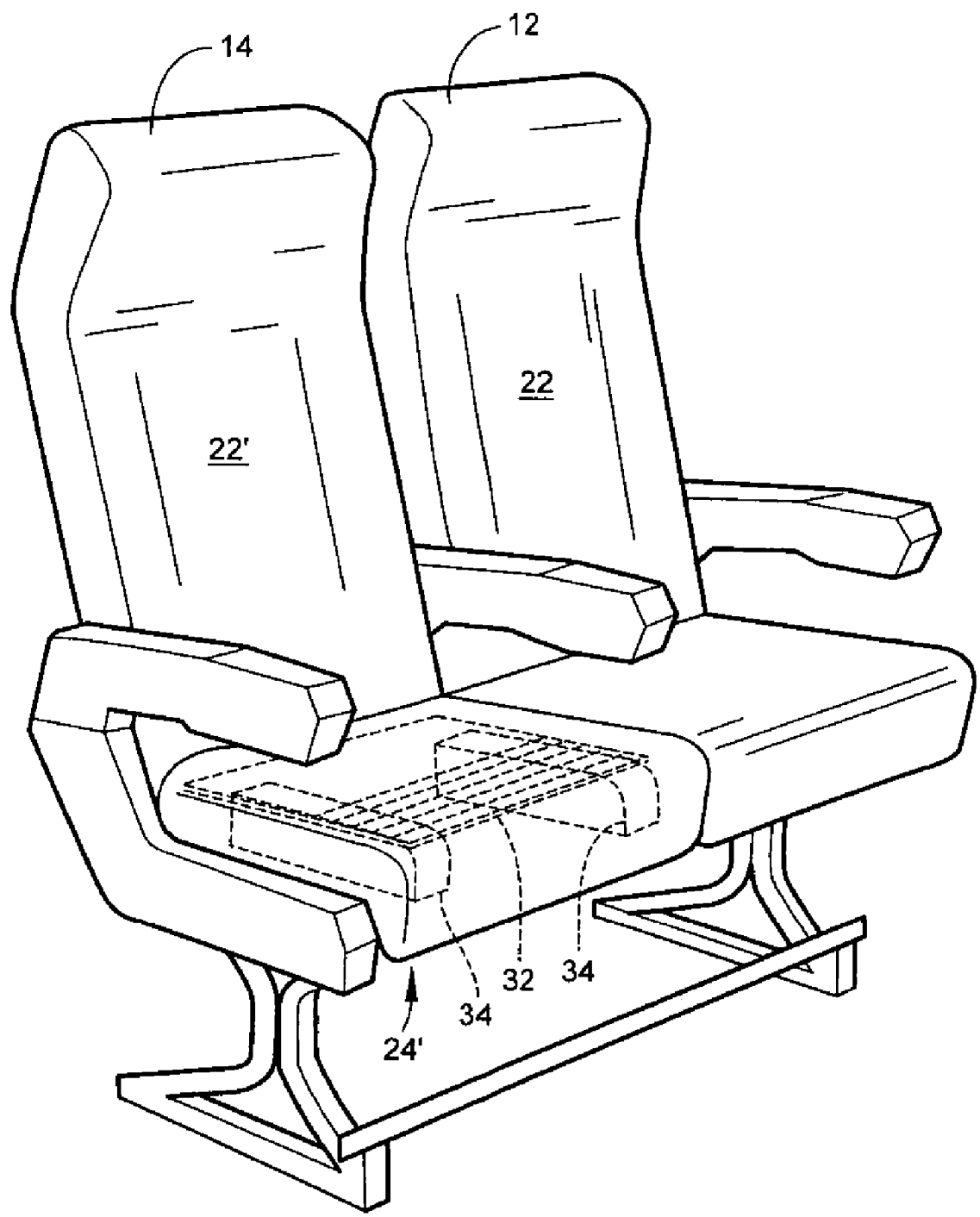
FIG. 3 is a perspective view of a seat set including a variable length seat bottom, showing an alternative arrangement of the internal components.
Figure 5:
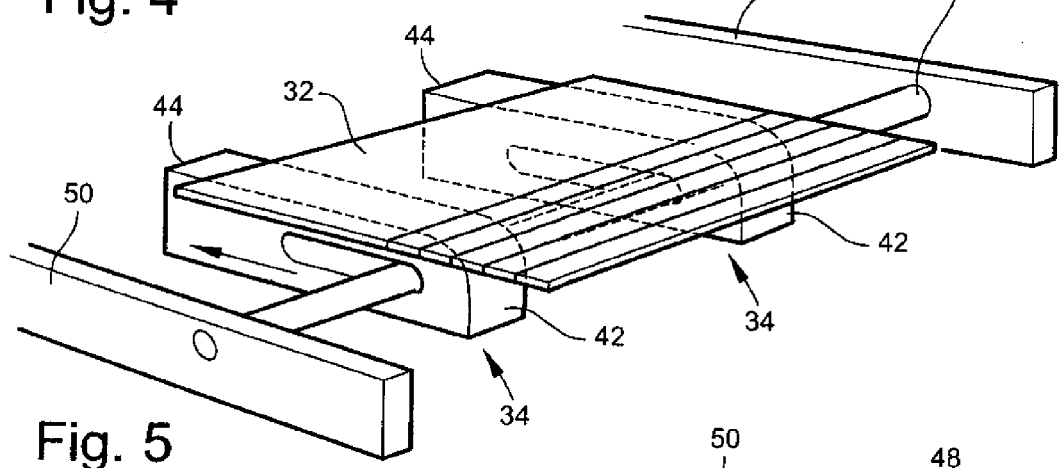
FIG. 5 is a schematic perspective view of the interior components of the seat bottom of FIG. 1, in a partially lowered position.
Figure 6:
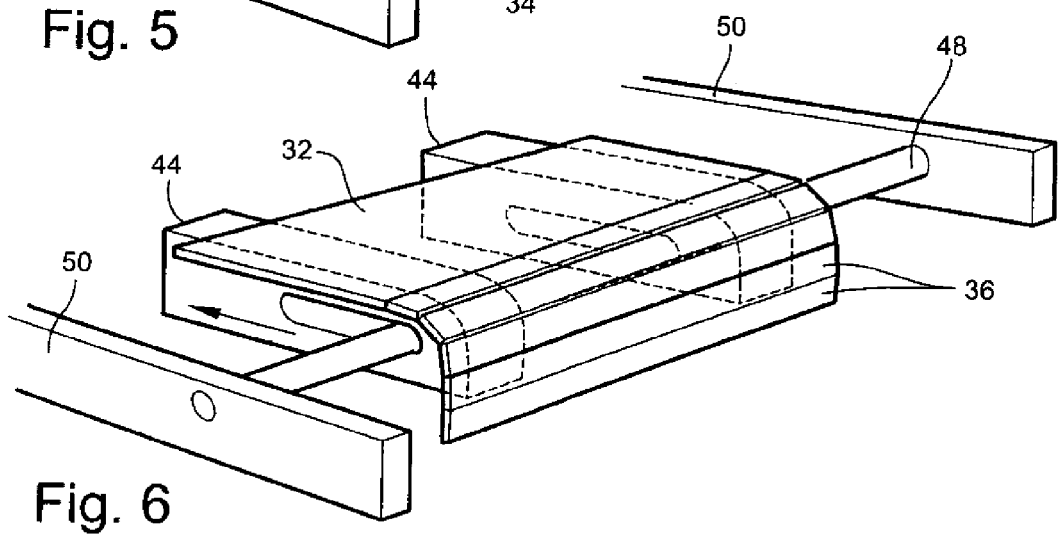
FIG. 6 is a schematic perspective view of the interior components of the seat bottom of FIG. 1, in a lowered position.
Figure 7:
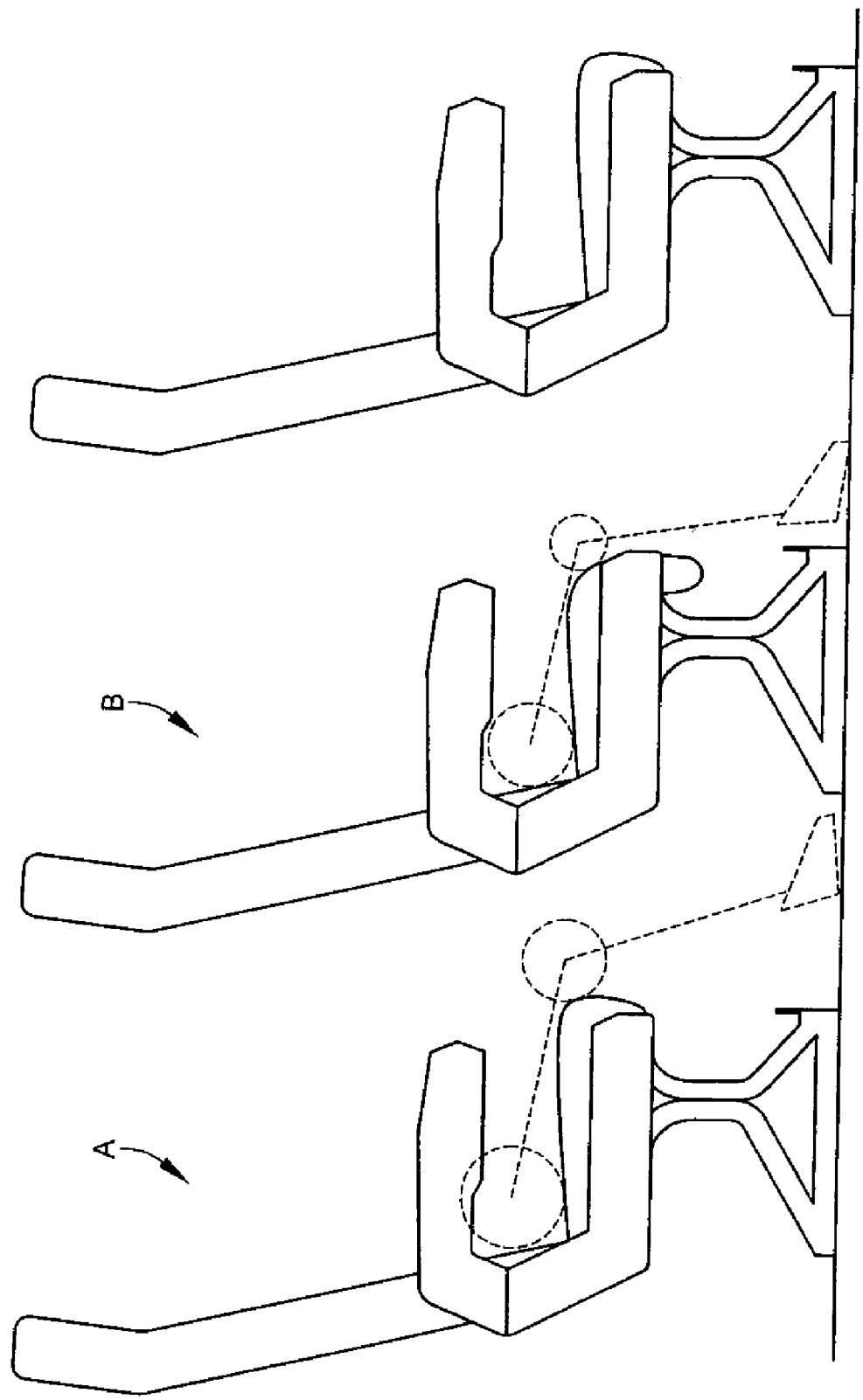
FIG. 7 is a side view of a plurality of rows of seats including variable length seat bottoms in various positions.
Figure 8:
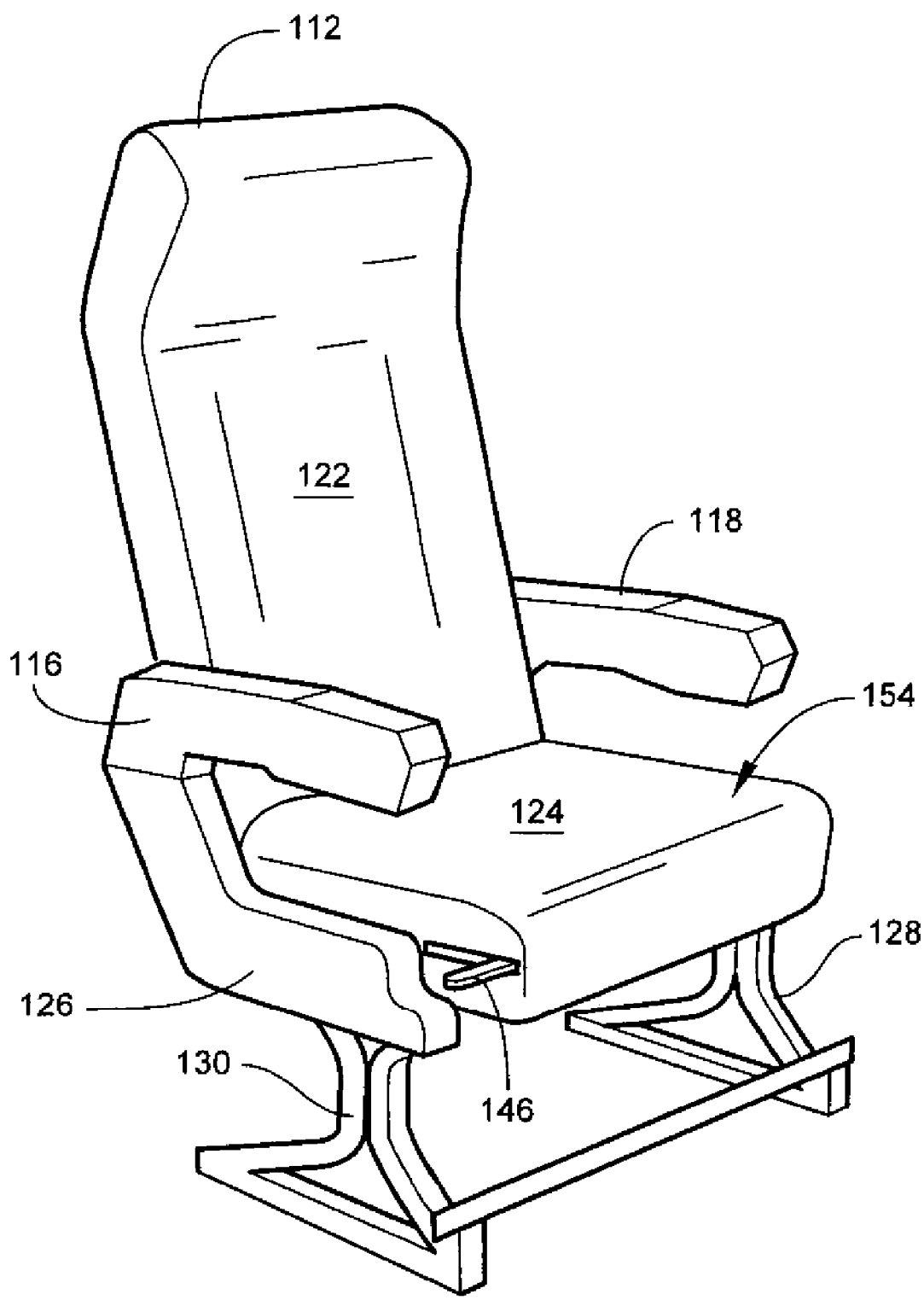
FIG. 8 is a perspective view of a passenger seat including an alternative embodiment of a variable length seat bottom.

In operation, the passenger's weight is supported by the support panel 32 and support rails 34. In the raised position, the support rails 34 are translated to a fully forward position as shown in FIGS. 1 and 4 and in seat "A" in FIG. 7. When the passenger wishes to stretch out, the support rails 34 are translated rearward as shown in FIG. 5. This may be done manually or by using an actuator of a known type (not shown) to move the support rails 34 rearward under power. As the support rails 34 move rearward, they retract from underneath the lateral segments 36 of the support panel 32. This allows the lateral segments 36 to fold downward over the bullnoses 46 of the support rails 34 in a manner similar to a waterfall (see FIG. 6). This action shortens the seat bottom 24' and effectively lowers the passenger's legs, as shown in FIG. 2 and in seat "B" of FIG. 7. This increases the passenger's leg room and increases comfort without increasing the relatively longitudinal spacing or "pitch" between the seat rows. Suitable means are provided for locking the support rails 34 in a desired longitudinal position.

FIGS. 8-12 illustrate a passenger seat 112 incorporating an alternative embodiment of a variable length seat bottom. The seat 112 is provided with two arm rests 116 and 118, both shown in the lowered passenger use position. The seat 112 includes a seat back 122 and a seat bottom 124. The seat 112 is supported by a frame 126. The frame 126 is mounted on legs 128 and 130 which are in turn mounted to the deck of the aircraft by track fittings of a known type.

Figure 9:
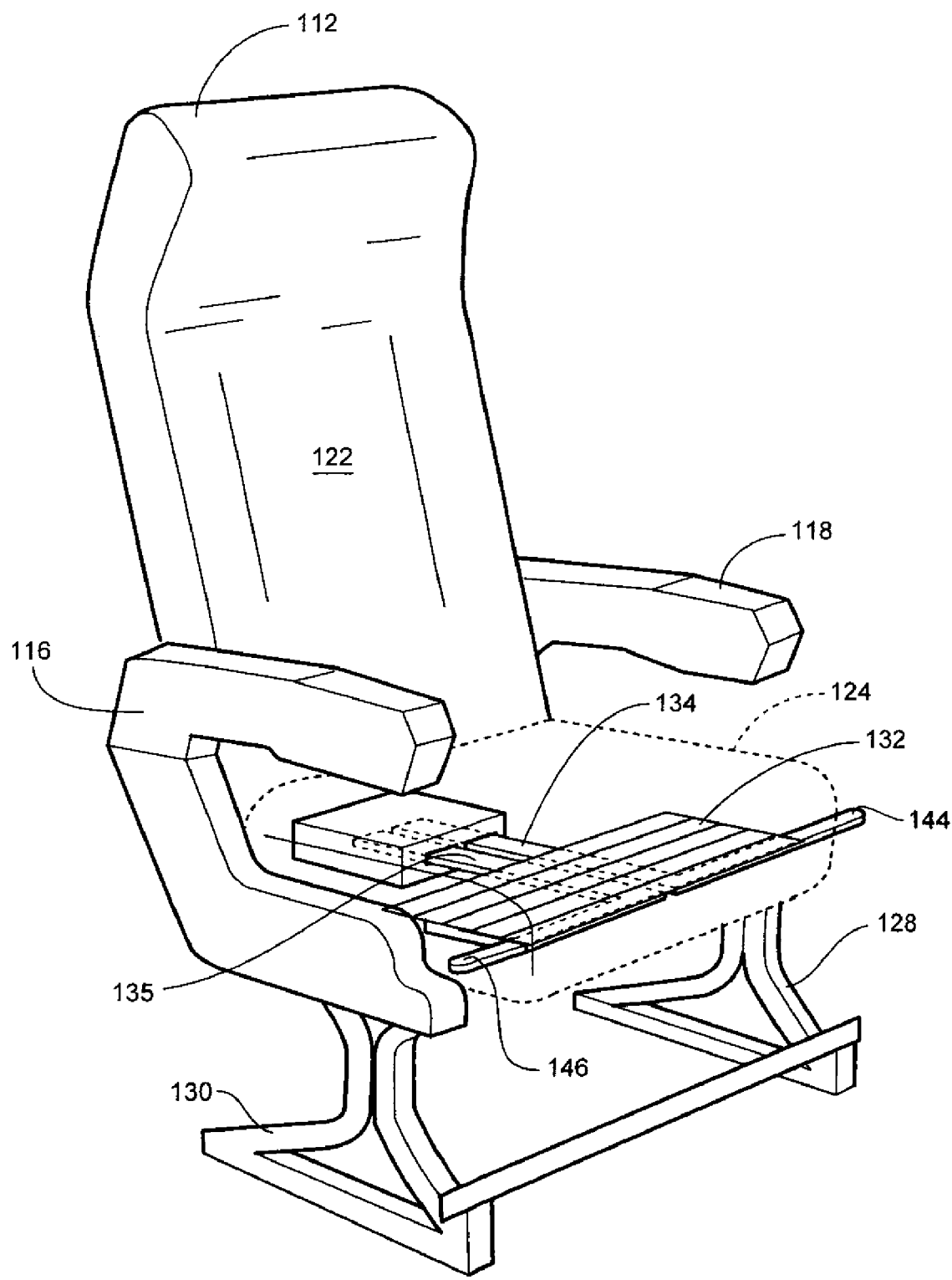
FIG. 9 is a perspective view of the seat of FIG. 8, showing the internal components thereof.

The internal components of the seat bottom 124 comprise a variable length support panel 132, and left and right support rails 134 and 135. Referring to FIG. 9, the support panel 132 is a generally planar member which is constructed to be substantially rigid except in a selected folding direction. In the illustrated example, the support panel 132 is constructed of a sheet of plastic or similar material approximately 3.2 mm (0.125 in.) thick. The forward part of the support panel 132 is split into separate left and right portions 137 and 139, each of which is divided into relatively narrow transversely-extending lateral segments 136 and 136' respectively by spaced-apart transversely-extending cuts or rabbets 138 and 138' which extend partway through the thickness of the support panel 132. The longitudinally-extending support rails 134 and 135 are disposed underneath the left and right portions 137 and 139 respectively, to transfer loads from the support panel to the seat frame 126. Laterally-extending bars 140 and 142, optionally defining handles 144 and 146, are attached to the front ends of the support rails 134 and 135, respectively.

Suitable means are provided for supporting the loads on the support panel 132 and the support rails 134 and 135 while allowing longitudinal sliding motion of the support rails 134 and 135. In the illustrated example, the support rails 134 and 135 are slidably received in slots 148 and 150 in a support block 152 which is fixed to the seat frame 126. Suitable padding or a cushion (not shown) may be placed on top of the support panel 132. The seat bottom 124 is covered with a dress cover 154 (see FIG. 8) which provides a unified appearance to the seat 112 and prevents debris from falling into the working parts of the seat 112.

Figure 10:
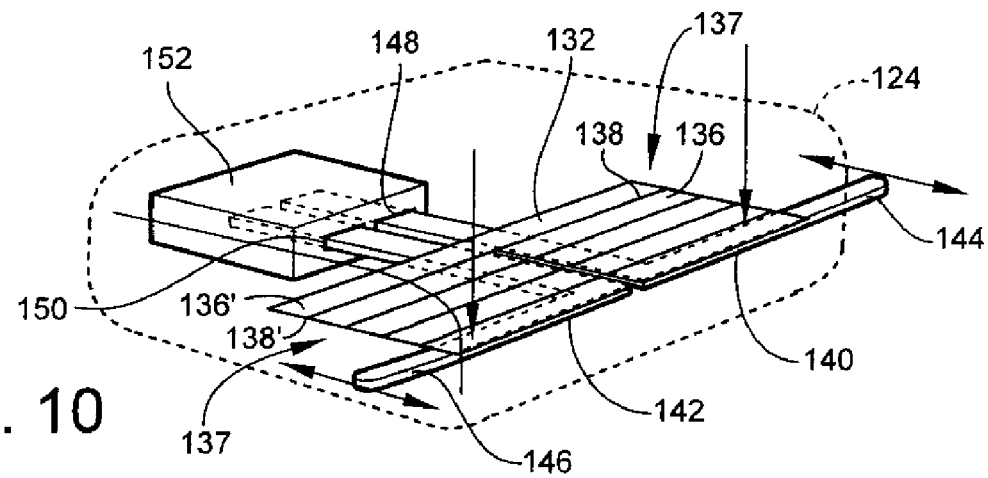
FIG. 10 is a perspective view of the internal components of the seat of FIG. 8 disposed in a first position.
Figure 11:
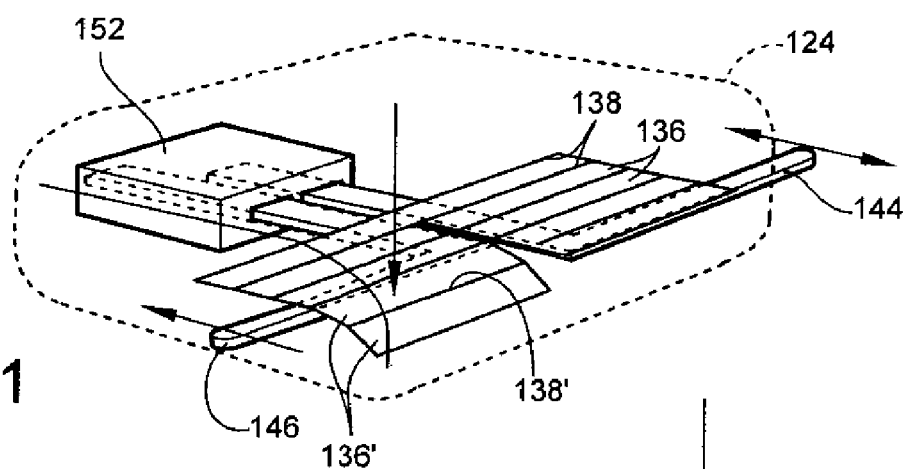
FIG. 11 is a perspective view of the internal components of the seat of FIG. 8 disposed in a second position.
Figure 12:
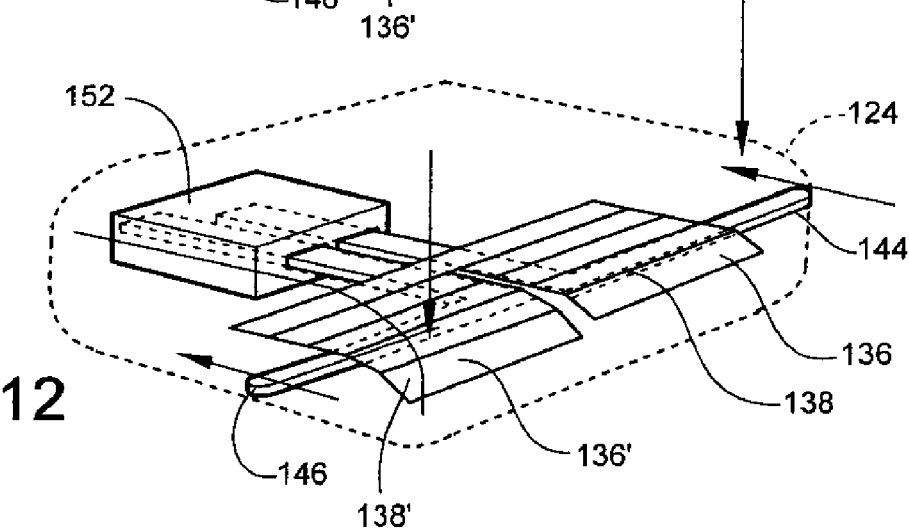
FIG. 12 is a perspective view of the internal components of the seat of FIG. 8 disposed in a third position.

In operation, the passenger's weight is supported by the support panels 132 and support rails 134 and 135. In the raised position, the support rails 134 and 135 are translated to a fully forward position as shown in FIG. 10. When the passenger wishes to stretch out, one or both of the support rails 134 or 135 may be translated rearward as shown in FIGS. 11 and 12. This may be done manually using the handles 144 and 146, or by using an actuator of a known type (not shown) to move the support rails 134 or 135 rearward under power. As the support rails 134 and 135 move rearward, they retract from underneath the lateral segments 136 and/or 136' of the support panel 132. This allows the lateral segments 136 and/or 136' to fold downward over the support rails 134 and 135 in a manner similar to a waterfall. This action shortens one or both sides of the seat bottom 124 and effectively lowers one or both of the passenger's legs. This increases the passenger's leg room and increases comfort without increasing the relatively longitudinal spacing or "pitch" between the seat rows. Suitable means are provided for locking the support rails 134 and 135 in a desired longitudinal position.

Figure 13:
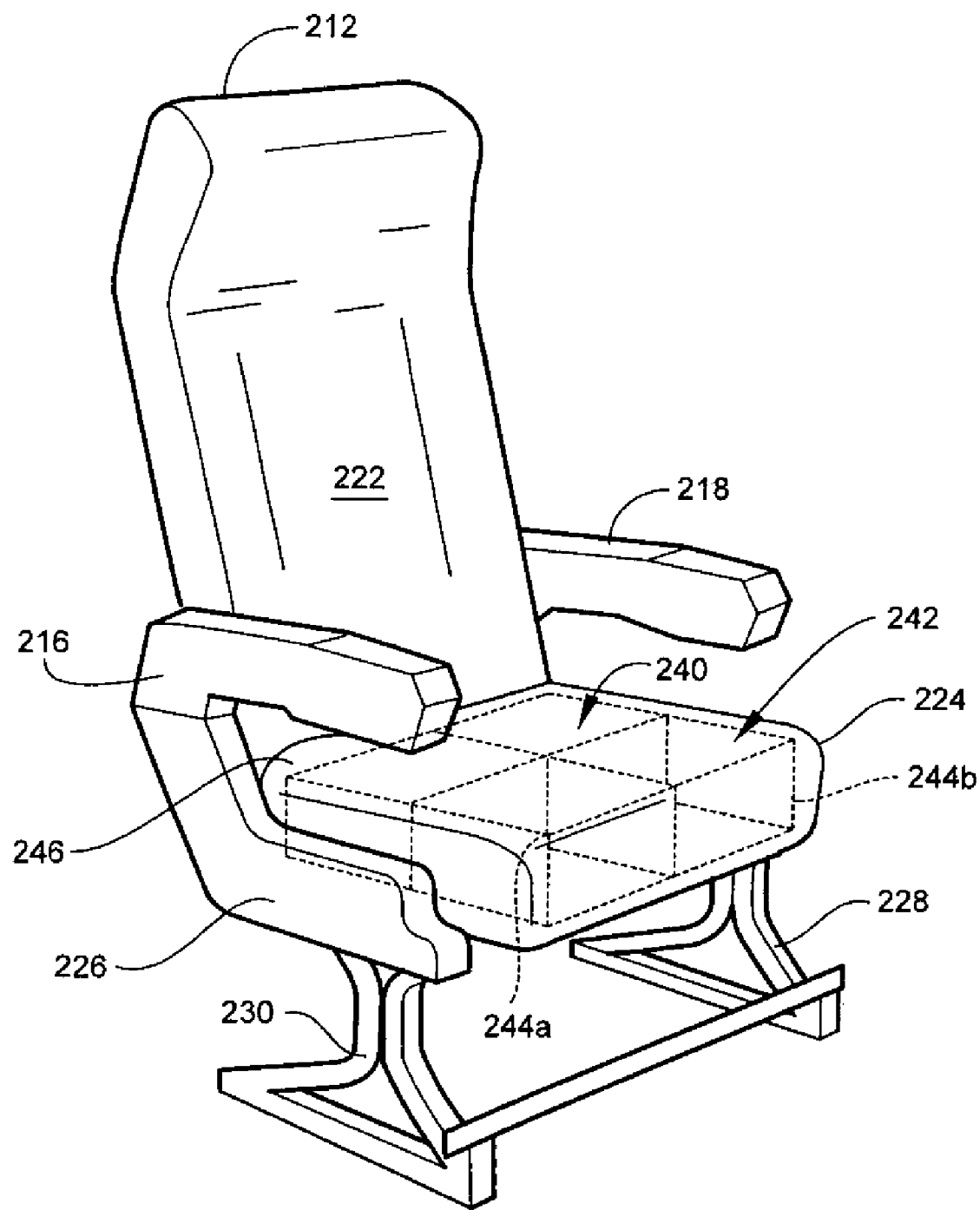
FIG. 13 is a perspective view of a passenger seat including another alternative embodiment of a variable length seat bottom.

It is noted that the specific structure used to adjust the length of the seal bottom 124 may be varied to suit a particular application. For example, FIG. 13 illustrates a passenger seat 212 incorporating an alternative internal construction. The seat 212 is provided with two arm rests 216 and 218, both shown in the lowered passenger use position. The seat 212 includes a seat back 222 and a seat bottom 224. The seat 212 is supported by a frame 226. The frame 226 is mounted on legs 228 and 230 which are in turn mounted to the deck of the aircraft by track fittings of a known type.

The internal components of the seat bottom 224 comprise an inner cushion structure 140 having a separate forward portion 242 which is partitioned into left and right flexible airtight compartments 244a and 244b. (Means are provided for selectively inflating and deflating each of these compartments 244a and 244b. For example, a small, passenger-controllable air compressor of a known type (not shown) may be selectively connectable to each of the compartments 244a and 244b using a suitable multi-directional valve and air tubing. A fabric dress cover 246 is placed over the inner cushion structure 240.

When the passenger wishes to change the effective length of the seat bottom, the air pressure is increased or decreased in the appropriate compartments 244a and 244b. For example, if the air pressure is decreased in compartment 244a while the air pressure is held constant in compartment 244b, the effective length of the right side of the seat bottom 224 will be effectively reduced. This allows the passenger to more easily remain in a "side sleep" or rotated position by reducing the pressure point on the "down side" leg.

The foregoing has described a seating arrangement having a variable length seat bottom. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A seat bottom assembly for a passenger seat, comprising:
    a variable length support panel constructed to be flexible in a predetermined folding direction, said support panel having a left portion and a separate right portion, each of the left portion and the right portion comprising a plurality of transversely-extending lateral segments that are movable relative to one another; and
    a structural support member disposed beneath each of the left portion and the right portion, said structural support member selectively moveable between:
        a first, forward position in which the seat bottom assembly has a nominal length in a longitudinal direction, and
        a second, rearward position in which at least one of the left portion and the right portion folds downward over said structural support member such that at least a portion of said seat bottom assembly has an effective length less than said nominal length;
    wherein the plurality of transversely-extending lateral segments of said support panel are divided by spaced-apart transversely-extending rabbets that extend at least partway through the thickness of said support panel.

2. The seat bottom assembly of claim 1 wherein said support panel is generally planar and the transversely-extending lateral segments of the left portion and the right portion of said support panel are pivotally connected by the rabbets.

3. The seat bottom assembly of claim 1 wherein the effective length of the left portion and the right portion of said support panel can be independently varied.

4. The seat bottom assembly of claim 1 wherein said structural support member disposed beneath each of the left portion and the right portion comprises a support rail configured for longitudinal sliding motion relative to said support panel.

5. The seat bottom assembly of claim 4 further comprising a support block having at least one slot formed therein for slidably receiving the support rail.

6. The seat bottom assembly of claim 4 wherein the support rail translates in the longitudinal direction between the first, forward position and the second, rearward position.

7. The seat bottom assembly of claim 1 wherein the support panel is made of a flexible plastic material and the plurality of transversely-extending lateral segments are separated by transversely-extending cuts formed in said support panel.

8. A seat bottom assembly for a passenger seat, comprising:
    a variable length support panel constructed to be flexible in a predetermined folding direction, said support panel having a left portion and a separate right portion, each of the left portion and the right portion comprising a plurality of transversely-extending lateral segments that are movable relative to one another; and
    a structural support member disposed beneath each of the left portion and the right portion, said structural support member selectively moveable between:
        a first, forward position in which the seat bottom assembly has a nominal length in a longitudinal direction, and
        a second rearward position in which at least one of the left portion and the right portion folds downward over said structural support member such that at least a portion of said seat bottom assembly has an effective length less than said nominal length;
    wherein said structural support member disposed beneath each of the left portion and the right portion comprises a support rail configured for longitudinal sliding motion relative to said support panel and wherein the support rail has a handle operable for effecting the longitudinal sliding motion.

9. The seat bottom assembly of claim 8 further comprising a support block having at least one slot formed therein for slidably receiving the support rail.

10. The seat bottom assembly of claim 8 wherein the support rail translates in the longitudinal direction between the first, forward position and the second, rearward position.

11. The seat bottom assembly of claim 8 wherein the support panel is made of a flexible plastic material and the plurality of transversely-extending lateral segments are separated by transversely-extending cuts formed in said support panel.

12. A passenger seat, comprising:
    a frame for being attached to a floor of a vehicle; and
    a seat bottom supported on said frame, the seat bottom comprising:
        a variable length support panel having a left portion and a separate right portion, each of the left portion and the right portion comprising a plurality of transversely-extending lateral segments that are movable relative to one another; and
        a structural support member disposed beneath each of the left portion and the right portion, said structural support member selectively moveable between:

a first, forward position in which the seat bottom assembly has a nominal length in a longitudinal direction, and a second, rearward position in which at least one of the left portion and the right portion folds downward over said structural support member such that at least a portion of said seat bottom assembly has an effective length less than said nominal length;

wherein each of the left portion and the right portion of said support panel is constructed from a sheet of a substantially rigid material having a forward portion which is divided into the transversely-extending lateral segments by spaced-apart transversely-extending rabbets.

13. A passenger seat, comprising:

a frame for being attached to a floor of a vehicle; and a seat bottom supported on said frame, the seat bottom comprising:

a variable length support panel having a left portion and a separate right portion, each of the left portion and the right portion comprising a plurality of transversely-extending lateral segments that are movable relative to one another;

a structural support member disposed beneath each of the left portion and the right portion, said structural support member comprising a support rail configured for longitudinal sliding motion relative to said support panel; and a support block having at least one slot formed therein for slidably receiving the support rail;

wherein the support rail has a handle operable for effecting the longitudinal sliding motion.

* * * * *